United States Patent [19]

Kramer

[11] 3,809,522
[45] May 7, 1974

[54] APPARATUS FOR MAKING CORRUGATED TUBING

[76] Inventor: Vance M. Kramer, 402 E. Boundry Rd., Perrysburg, Ohio 43551

[22] Filed: Jan. 5, 1972

[21] Appl. No.: 215,612

[52] U.S. Cl.................... 425/387, 425/392, 264/94
[51] Int. Cl. ............................................. B29c 17/00
[58] Field of Search ...... 425/387, 392, 393; 264/94, 264/DIG. 52

[56] References Cited
UNITED STATES PATENTS

| | | | |
|---|---|---|---|
| 2,897,840 | 8/1959 | Roberts et al. | 264/94 X |
| 2,936,812 | 5/1960 | Roberts | 264/94 |
| 3,021,571 | 2/1962 | Jackson et al. | 264/88 |
| 3,168,604 | 2/1965 | Kramer et al. | 264/DIG. 52 |
| 3,705,780 | 12/1972 | Kramer et al. | 264/94 |
| 2,712,157 | 7/1955 | Holte | 264/DIG. 52 |
| 3,194,041 | 7/1965 | Johnson | 264/94 X |

*Primary Examiner*—Robert L. Spicer, Jr.
*Attorney, Agent, or Firm*—Bosworth, Sessions & McCoy

[57] ABSTRACT

An apparatus for making corrugated rubber tubing in which embryonic corrugations are formed in a sleeve of uncured rubber by sliding the sleeve axially into the annular space between a mandrel and a forming member having no moving parts that surrounds the mandrel and in fixed, concentric relation thereto. The forming member provides immovable edge means and intervening spaces against which the sleeve is expanded by fluid pressure to form the embryonic corrugations. The sleeve is then removed from the annular space, axially collapsed to form the corrugations and then cured to set the corrugations.

5 Claims, 8 Drawing Figures

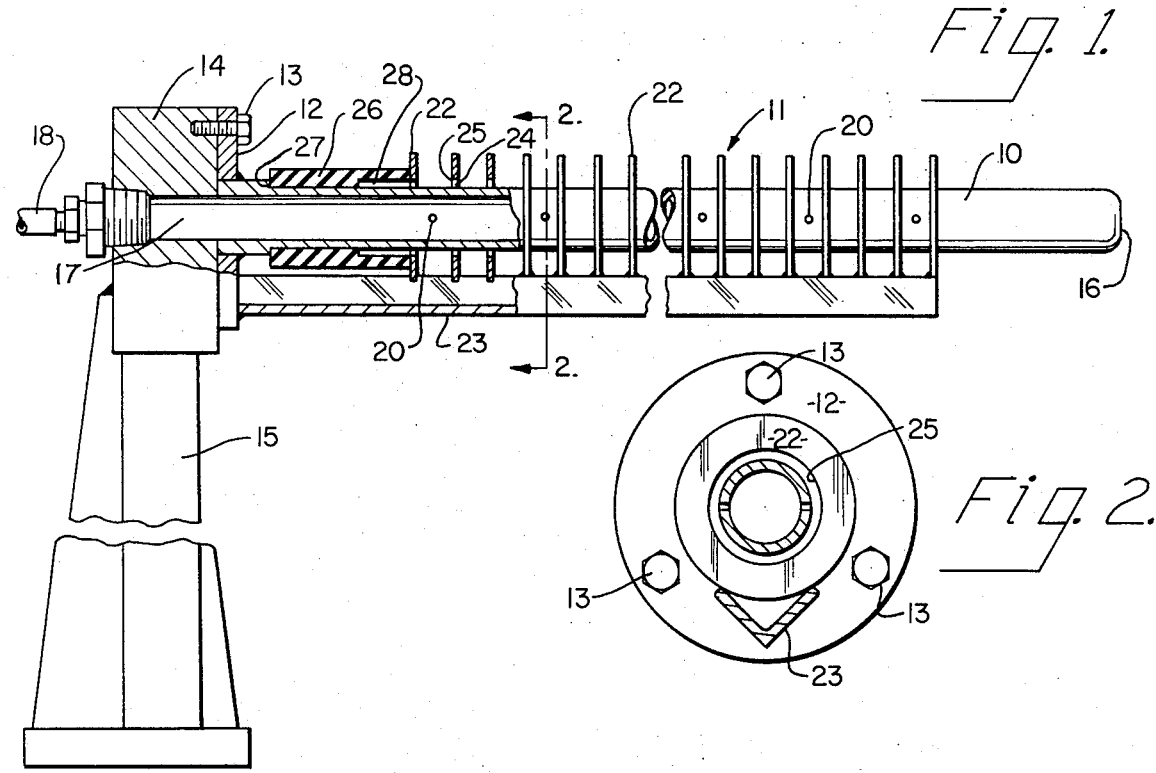
Fig. 1.
Fig. 2.
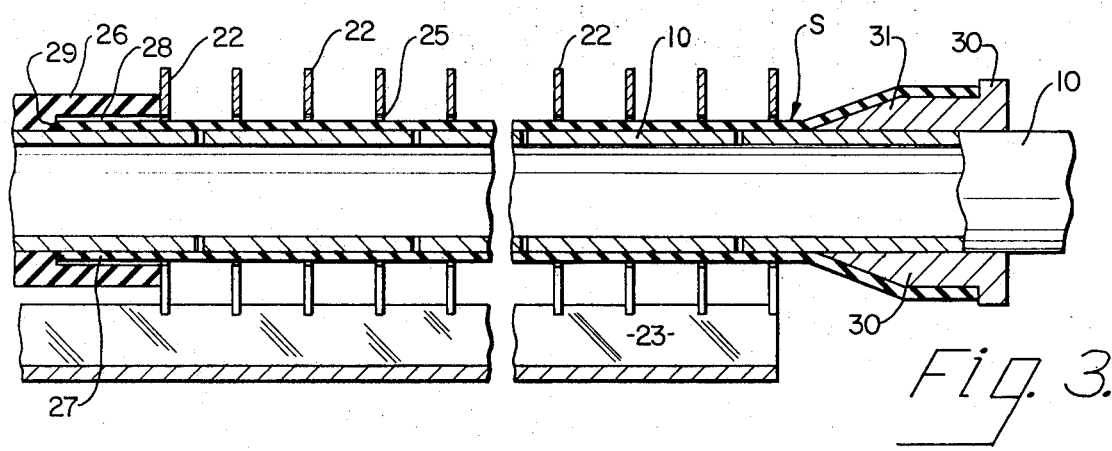
Fig. 3.
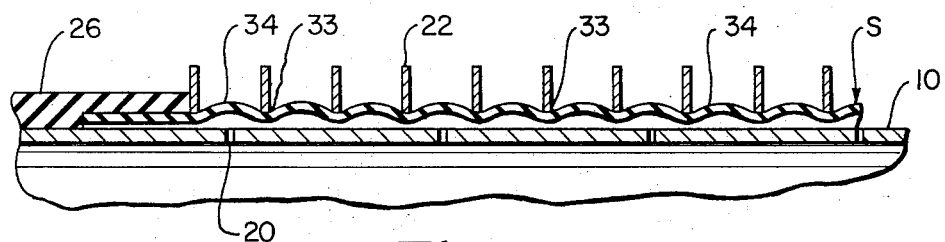
Fig. 4.

APPARATUS FOR MAKING CORRUGATED TUBING

BACKGROUND OF THE INVENTION

This invention relates to the manufacture of flexible rubber tubing having either annular or helical corrugations therein and more particularly to an apparatus and method for making such tubing in which preliminary impressions are formed in uncured rubber sleeves, the presence of the impressions causing the desired corrugations to be formed upon subsequent axial compression of the uncured rubber sleeves which are thereafter cured.

As disclosed in my U.S. Pat. Nos. 3,168,604 and 3,304,581 and in United States patent 3,705,780, corrugated rubber tubing may be made by the use of spring-like forming members that are employed with forming mandrels to produce embryonic corrugations in uncured rubber sleeves. Each time a tube is formed, the forming member is placed over the forming mandrel and then elongated to the desired length so that spaces are defined between the convolutions of the member, the sleeve is then expanded so that it bulges into the spaces between the convolutions, the forming member is then collapsed axially to squeeze the sleeve in concertina fashion to form corrugations between the convolutions of the forming member and to crease the uncured rubber. Next, the forming member is extended and removed from the sleeve by pulling at one end. Thereafter, the sleeve is removed from the forming mandrel and placed on a curing mandrel where it is axially collapsed to the desired length and subjected to a curing operation to set the corrugations. Other methods of making corrugated flexible tubes are illustrated, for example, in the Burton U.S. Pat. No. 2,616,129 and the Louth U.S. Pat. No. 3,371,381, both of which employ split forming members that must be opened to permit the positioning of a mandrel having a rubber sleeve thereon between them, closed during the formation of corrugations in the sleeve and then opened again to permit removal of the mandrel carrying the sleeve, which is subsequently cured.

SUMMARY OF THE INVENTION

A general object of the present invention is to provide an improved and simplified apparatus for forming corrugated rubber tubing. Other objects of the invention are the provision of an apparatus for the production of such tubing that can be constructed at low cost and in which the method can be carried out rapidly and efficiently to produce accurately formed and durable tubing at low cost.

These and other objects of the invention are accomplished by a simple apparatus comprising a hollow cylindrical forming mandrel adapted to receive a sleeve of uncured rubber and a forming member, which, in the case of an apparatus for the production of tubing with annular corrugations, comprises a series of annular discs that are supported in fixed relation to each other and to the forming mandrel and are spaced apart with their central openings aligned so that the inner edges of the central openings of the discs define a cylinder that has an internal diameter slightly greater than the external diameter of the rubber sleeve to be formed into a tubing blank on the apparatus. The forming member is fixedly supported co-axially of the mandrel so that the outer surface of the mandrel and the inner edges of the discs define an annular space that can receive a tubular sleeve to be formed. The mandrel has openings through its wall so that compressed air can be supplied to the interior of a sleeve on the mandrel to expand the sleeve into engagement with the forming member and form embryonic corrugations in it, the ends of the sleeve being restrained to assure the development of sufficient pressure to expand the sleeve to the desired extent. This comprises the apparatus for making the preliminary impressions in the sleeve which cause the sleeve to take the desired corrugated form when the sleeve is axially collapsed.

According to the method, a sleeve to be formed into a tube is simply slid over the mandrel into the annular space between the mandrel and the forming member, is expanded into engagement with the forming member by compressed air and then withdrawn from the annular space within the forming member without further ado and without requiring any movement or adjustment of the mandrel or forming member by simply grasping one end of the sleeve and pulling it axially off of the mandrel. Pulling the end of the sleeve reduces the depths of the corrugations sufficiently to permit the sleeve to be removed from the forming member but does not permanently return the sleeve to its original cylindrical shape. Thus, it is only necessary to place the sleeve on another support, collapse the sleeve axially to the desired degree to form corrugations in the sleeve and then vulcanize the sleeve while it is collapsed to set the corrugations and complete the tubing.

In producing tubing with helical corrugations, the same type of apparatus is employed except that the forming member consists of a helical member having an inner helical edge that surrounds the mandrel and which is engaged by the sleeve when the sleeve is expanded, thus forming a helical indentation or crease in the exterior surface of the sleeve. In either case the sleeve, after removal from the forming mandrel and from within the forming member, is axially shortened, by hand in the case of small tubing, to the desired degree to produce either tubing in which the walls of adjacent corrugations are in contact with each ("compressed tubing") or tubing in which the corrugations are of less radial depth and of great axial extent, the type of corrugations depending upon the amount of axial compression of the sleeve before and during vulcanization.

BRIEF DESCRIPTION OF THE DRAWINGS

FIG. 1 is a side elevational view, with parts broken away, showing a preferred form of apparatus for making tubing with annular corrugations;

FIG. 2 is a transverse sectional view taken along the line 2—2 of FIG. 1;

FIG. 3 is a sectional view to an enlarged scale illustrating an uncured rubber sleeve in position upon the forming mandrel and within the forming member of FIGS. 1 and 2 preparatory to expansion;

FIG. 4 is a fragmentary sectional view illustrating the general configuration of the rubber sleeve while it is expanded by internal pressure;

DESCRIPTION OF THE PREFERRED EMBODIMENTS

Figure 5:
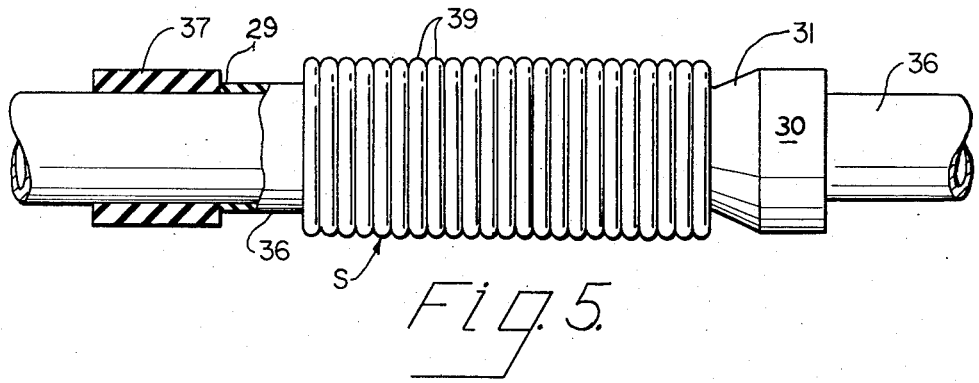
FIG. 5 illustrates the sleeve in compressed form on the mandrel on which it may be vulcanized and also shows the external appearance of the completed tubing.

As shown in FIGS. 1 and 2 a preferred form of apparatus for making tubing with annular corrugations according to my invention comprises a forming mandrel 10 and a forming member indicated in general at 11, both of which are supported as cantilevers by being secured at their inner ends to a disc 12 as by welding or brazing. Disc 12 is detachably secured, as by cap screws 13 to a supporting block 14 mounted at a convenient level on a pedestal 15. For convenience, the mandrel 10 and the forming member 11 preferably project horizontally.

In order to provide for admission for air under pressure to expand a rubber sleeve S positioned on the mandrel (see FIGS. 3 and 4), the mandrel is hollow as shown and has a closed outer end 16, the inner end of the mandrel being in open communication with a passage 17 in the block 14 which in turn is connected to a conduit 18 leading to a source of air under pressure. An appropriate valve, not shown, under the control of the operator is provided for controlling the admission of air to the interior of the mandrel. Perforations 20 in the wall of the mandrel provide for flow of air from the interior of the mandrel to the interior of the rubber sleeve S.

The forming member 11 comprises a series of annular discs 22, the outer edges of which are welded or brazed, as indicated in FIG. 2, to a length of angle iron 23 that extends parallel to the mandrel 10, the inner end of the angle iron 23 being welded to the disc 12 to support the entire forming member in fixed position with respect to the mandrel 10. The discs 22 are parallel to each other and extend at right angles to the axis of the mandrel. The central openings 24 of the discs are co-axial with each other and with the axis of the mandrel. Thus, the inner edges 25 of the discs together define a cylinder co-axial with the mandrel and having a diameter sufficiently larger than the exterior diameter of the mandrel to permit a sleeve S to be slid over the mandrel and within the openings 24, as shown in FIG. 3.

In a typical forming tool the discs are washers made from 18-gage steel and for producing tubing having an internal diameter of about 1½ inches, the external diameter of the mandrel 10 is about 1 3/16 inches. With a rubber tube having a wall thickness of about one-sixteenth of an inch, washers having circular inner openings 24 about 1 9/16 inches in diameter provide ample clearance to permit insertion of a sleeve of uncured rubber into the annular space between the mandrel and the inner edges 25 of the washers 22. The inner edges of the washers are carefully smoothed and the corners rounded to eliminate burrs and prevent possibility of damage to the surface of the rubber by the edges of the washers. The external diameter of the washers is not important so long as they are large enough so that the angle iron 23 will not interfere with the expansion of the sleeve as described below.

In order to locate the sleeves S longitudinally with respect to the mandrel when they are inserted into the annular space, the inner end of the mandrel is provided with a collar 26 composed of hard rubber or similar material that abuts against a shoulder 27 on the exterior of the mandrel 10. The collar extends into contact with the disc 22 that is closest to the supporting block 14 and is provided with an annular recess 28 that receives the forward end 29 of each sleeve as it is positioned on the mandrel. The collar not only acts as a stop to limit the movement of the sleeve onto the mandrel but also prevents undue expansion of the sleeve at the end beyond the innermost disc and prevents undue leakage when air under pressure is admitted to the interior of the mandrel to expand the sleeve into engagement with the inner edges 25 of the discs 22.

In use, a rubber sleeve S of the required length is slid over the mandrel and within the forming member 11 until the forward end 29 of the sleeve engages the shoulder at the bottom of the annular recess 28 in the collar 26. Preferably, the sleeve, which is of uncured rubber just as it comes from the extruder, is heated slightly by immersing it in a water bath at a temperature of about 115° to 125° before being slid onto the mandrel and a lubricant such as a silicone solution or emulsion is applied to the exterior of the mandrel. Also, a metal preformed head 30 having a tapered nose portion 31 may be inserted into the outer end of the sleeve before the sleeve is placed on the mandrel 10. The head 30 minimizes leakage of air from the outer end of the sleeve when air under pressure is applied and the tapered nose 31 produces a flared end in the completed tube. The position of the sleeve with respect to the mandrel and forming member and prior to expansion of the sleeve is shown in FIG. 3. An operator can slide the sleeve into the position shown rapidly and with little effort.

After the sleeve has been positioned as shown in FIG. 3, the operator opens a valve that is preferably controlled by a foot pedal to admit air under pressure to the interior of the mandrel, the air flowing through the openings 20 into the space between the mandrel and the sleeve, and expanding the sleeve as shown in general in FIG. 4, the operator holding the head 30 in position on the mandrel during the expanding operation. The air supply is regulated to the desired pressure, a pressure of about 90 pounds per square inch being sufficient with sleeves having a wall thickness of about 1/16 of an inch. The expansion takes place very rapidly, not more than a second or two being required to complete the preforming step and to produce the preliminary creases 33 and intermediate bulges 34 in the sleeve as shown in FIG. 4.

As soon as the preforming operation has been completed, the operator releases the air under pressure from within the mandrel and removes the sleeve from the mandrel and from within the forming member simply by pulling the sleeve longitudinally out of the annular space between the forming member and the mandrel. During this operation, the sleeve is stretched slightly and the diameter of the bulges 34 is reduced enough to permit the sleeve to be drawn readily out of the forming member and off of the mandrel without damage to the sleeve and without eliminating the embryonic corrugations constituted by the preliminary creases 33 and bulges 34.

After the unvulcanized sleeve has been removed from the preforming apparatus, it is placed on a vulcanizing mandrel which preferably consists simply of an aluminum tube 36 as shown in FIG. 5, having a hard rubber collar 37 thereon. The sleeve S, having the creases 33 therein is slid over the tube 36 until the end 29 of the sleeve abuts the collar 37. Then the operator continues to advance the other end of the sleeve by the head 30. This movement collapses the tube concertina fashion and causes the embryonic bulges 34 in the tube to expand outwardly to form corrugations 39 as shown in FIG. 5. The tube then may be cured while in this condition, forming what is known as a compressed tube. The completed tube has the appearance shown in FIG. 5.

Figure 6:
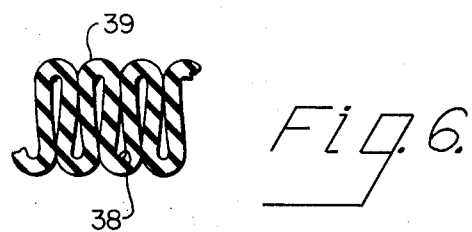
FIG. 6 is an enlarged sectional view of a portion of the wall of the completed tubing.

A section through the wall of the completed tube has the appearance shown in somewhat exaggerated fashion in FIG. 6. It will be noted that the rubber takes a natural curve and there are no sharp bends where severe stress concentrations might occur. The reason for this is that the preliminary impressions 33 in the sleeves are made only by the smooth rounded edges of the discs 22 at the bases of the corrugations. When the sleeve is shortened to form the corrugations, the bulges 34 bend naturally without constraint and thereby fall into easy curves.

Figure 7:
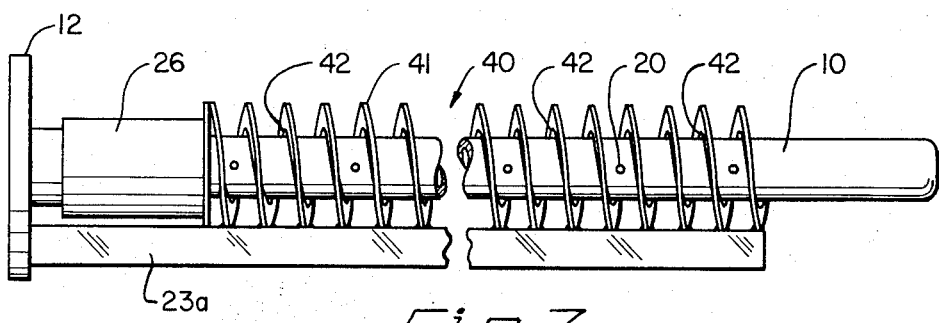
FIG. 7 illustrates an apparatus for the production of tubing with helical corrugations.

If it is desired to produce tubing with helical corrugations rather than annular corrugations, the apparatus shown in FIG. 7 may be employed. This preferably comprises a forming mandrel 10 identical with the previously described mandrel bearing the same number. The mandrel is supported by a disc 12 which may be mounted on a pedestal as previously described. The mandrel has perforations 20 and a collar 26, and is connected to a source of air under pressure, all as previously described. In the present modification, however, the external forming member 40 comprises a helix 41 which can be made by winding a steel strip edgewise into a helical spring. The forming member, thus, is similar to the helical forming member disclosed in U.S. Pat. No. 3,304,581 but instead of being an unsupported spring as in the case of that patent, each turn of the helical forming member is secured as by welding or brazing to an angle iron 23a like the previously described angle iron 23, and which is fixed to the disc 12. The turns of the helix 41 are thus permanently and accurately spaced from each other and with respect to the mandrel, and the inner edges of the helical turns define an annular space to receive an uncured sleeve to be preformed as before. However, in this case, instead of providing a succession of spaced annular edges as in the case of member 11, the forming member 40 provides a continuous helical inner edge 42 againt which the sleeve is expanded to form embryonic corrugations.

In use the forming member 40 is utilized in precisely the same manner as the previously described member 11. Briefly, a sleeve S is slid onto the mandrel 10 within the annular space defined by the inner helical edge of the helix 41, just as described in connection with and shown in FIG. 3. Thereafter, the sleeve is expanded by internal air pressure to form a continuous helical crease or indentation in the exterior of the sleeve with a helical bulge between the turns of the crease. The appearance of the sleeve at this stage is like FIG. 4 except that the crease and bulge are helical instead of annular as shown in that figure. The air pressure is released and the sleeve with the preformed crease and bulge that define an embryonic helical corrugation is pulled off of the mandrel 10 and out from within the forming member 40. It is then placed on a vulcanizing mandrel, compressed as before and vulcanized to set the corrugations, providing a tube that is similar to the tube previously described except that the corrugations are helical instead of annular.

Figure 8:
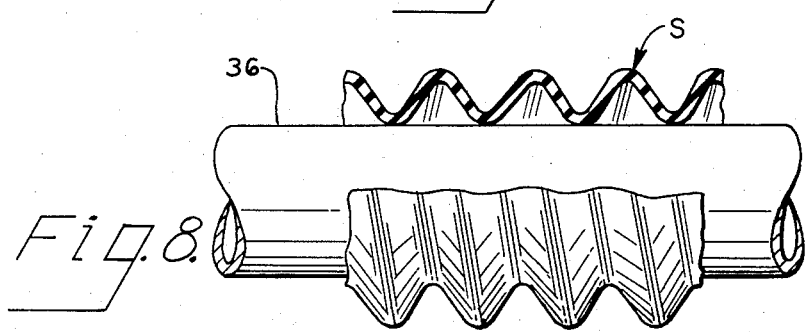
FIG. 8 is a fragmentary view, partially in section, illustrating tubing with helical corrugations in which the axial length of the tubing has been shortened to a lesser extent than in FIG. 5 to produce longer corrugations of less depth.

If it is desired to produce either annular or helical tubing with shallower and more widely spaced corrugations, it is only necessary to extend the unvulcanized sleeve on the aluminum tube 36 from the compressed condition shown in FIG. 5 to the desired amount as shown, for example, in FIG. 8. Alternatively, instead of first compressing the unvulcanized sleeve and then extending it, the sleeve may simply be shortened to the degree necessary to produce corrugations of the desired depth and spacing, again, as shown in FIG. 8. Thereafter, the tube is retained in this condition on the vulcanizing mandrel or tube 36 and vulcanized to produce tubing having the desired depth of corrugations.

From the foregoing description of preferred forms of my invention, it will be evident that the invention provides an improved apparatus for the manufacture of flexible corrugated rubber tubing. The preforming apparatus comprises the forming mandrel and the forming member and has no moving parts. The apparatus can be manufactured at reasonable cost so that different preforming devices for different sizes and types of tubing can be provided without undue expense and utilized if desired with the same pedestal and air supply. The tubing produced is accurate because the external forming member is fixed in position with respect to the mandrel and the turns of the external member are accurately fixed with respect to each other, resulting in accurate formation of preliminary creases and intervening bulges and ultimately in accurate spacing and depth of the corrugations. Also, the inner edges of the forming member are spaced accurately radially from the mandrel 10 resulting in substantially uniform depth of the creases and a uniform amount of bulging in the preforming step, which further contributes to the accuracy of the corrugations in the completed tube.

Since the forming member has no moving parts and since the sleeve is positioned in the forming member and withdrawn therefrom by movement purely in axial directions, the preliminary forming step can be carried out rapidly and economically without requiring any particular degree of skill on the part of the operator. After the preliminary forming step has been completed, the final formation and vulcanizing of the sleeve to provide the tubing can also be carried out rapidly and economically.

While I have illustrated only two forms of apparatus embodying the invention, it is to be understood that other types of tubing can be produced. For example, tubing with combinations of helical and annular corrugations can be provided and the tubing can be of oval or rectangular cross-section rather than round, if desired.

Those skilled in the art will appreciate that various changes can be made in my apparatus without departing from the spirit and scope of the invention as defined by the appended claims.

I claim:

1. Apparatus for making corrugated rubber tubing from a sleeve composed of unvulcanized rubber of substantially uniform cross section comprising an elongated mandrel adapted to support a sleeve of uncured rubber and a forming member supported in fixed relation with respect to the mandrel, said forming member having inwardly facing, immovable edge means defining a surface coaxial with and surrounding said mandrel and spaced sufficiently therefrom to admit the positioning of a sleeve on said mandrel and within said forming member by longitudinal movement along said mandrel, means for creating a differential fluid pressure between the interior and exterior of said sleeve to expand the sleeve, said edge means providing a plurality of continuous, uninterrupted turns fixed with respect to each other and with respect to the mandrel and being adapted to form embryonic corrugations in a sleeve positioned on said mandrel upon expansion of the sleeve into engagement with said edge means and said forming member comprising shaping means permanently secured to an elongated member extending parallel to said mandrel, and means at one end of said elongated member and said mandrel for supporting said shaping means as contilevers.

2. Apparatus according to claim 1 wherein the outer surface of the mandrel and the surface defined by the edge means are cylindrical.

3. Apparatus according to claim 2 wherein said cylindrical surfaces are circular.

4. Apparatus according to claim 1 wherein the forming member comprises a series of annular discs fixedly supported coaxially of said mandrel and longitudinally spaced along the mandrel, the inner edges of the annular discs constituting the edge member.

5. Apparatus according to claim 1 wherein the discs are annular washers and the elongated member is an angle iron, the outer edges of the washers being fixed to the angle iron.

* * * * *

PO-1050
(5/69)

UNITED STATES PATENT OFFICE
CERTIFICATE OF CORRECTION

Patent No. 3,809,522              Dated    May 7, 1974

Inventor(s)   Vance M. Kramer

It is certified that error appears in the above-identified patent and that said Letters Patent are hereby corrected as shown below:

Column 1, lines 8 and 9, delete "and method".

Column 3, line 55, change "1 1/2 inches" to --1 1/4 inches--.

Column 8, line 5, correct the spelling of "cantilevers".

Signed and sealed this 10th day of September 1974.

(SEAL)
Attest:

McCOY M. GIBSON, JR.              C. MARSHALL DANN
Attesting Officer                 Commissioner of Patents